US007832086B2

(12) United States Patent
Inaoka et al.

(10) Patent No.: US 7,832,086 B2
(45) Date of Patent: Nov. 16, 2010

(54) ALIGNMENT JIG, MANUFACTURING METHOD THEREOF, AND METHOD OF MANUFACTURING LIQUID-JET HEAD UNIT

(75) Inventors: Yasuo Inaoka, Nagano-ken (JP); Isao Yanagisawa, Nagano-ken (JP); Yoshihiro Igarashi, Nagano-ken (JP); Hiroshige Owaki, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 814 days.

(21) Appl. No.: 11/441,089

(22) Filed: May 26, 2006

(65) Prior Publication Data

US 2006/0265851 A1 Nov. 30, 2006

(30) Foreign Application Priority Data

May 26, 2005 (JP) ............................ 2005-153852

(51) Int. Cl.
*B23P 19/00* (2006.01)
*B23P 17/00* (2006.01)
*B21D 53/76* (2006.01)

(52) U.S. Cl. .......................... 29/759; 29/760; 29/890.1

(58) Field of Classification Search ................ 29/890.1, 29/759, 760
See application file for complete search history.

(56) References Cited

U.S. PATENT DOCUMENTS 5,881,453 A * 3/1999 Avery et al. ................... 29/834
2001/0045043 A1* 11/2001 Lebrun ........................ 40/800
2002/0051031 A1* 5/2002 Shin et al. ...................... 347/40
2004/0163243 A1* 8/2004 Noda et al. .................... 29/834
2006/0199353 A1* 9/2006 Kub et al. ................... 438/455

FOREIGN PATENT DOCUMENTS

JP 2002-160376 * 6/2002
JP 2002-160376 A 6/2002

* cited by examiner

*Primary Examiner*—A. Dexter Tugbang
*Assistant Examiner*—David P Angwin
(74) *Attorney, Agent, or Firm*—Sughrue Mion, PLLC

(57) ABSTRACT

An alignment jig including:

a base jig which is used when aligning and bonding a nozzle plate which is provided with nozzle orifices ejecting liquid of a liquid-jet head with/to a fixing member holding a nozzle plate side of the plurality of liquid-jet heads, and which is provided with an optical system on a bottom plane thereof;

a mask having transparency, one plane of which is bonded to a plane of the base jig opposite to the optical system, and the other plane of which is provided with a reference mark for being aligned with an alignment mark provided for the nozzle plate; and a spacer jig which is bonded to a plane of the mask where the reference mark of the mask is provided, and which holds the fixing member.

11 Claims, 10 Drawing Sheets

ALIGNMENT JIG, MANUFACTURING METHOD THEREOF, AND METHOD OF MANUFACTURING LIQUID-JET HEAD UNIT

The entire disclosure of Japanese Patent Application. No. 2005-153852 filed May 26, 2005 is expressly incorporated by reference herein.

BACKGROUND

1. Technical Field

The present invention relates to: an alignment jig used when aligning and bonding a nozzle plate of a plurality of liquid-jet heads, which eject liquid, with a fixing member; a manufacturing method thereof; and a method of manufacturing a liquid-jet head unit using the alignment jig.

2. Related Art

An ink-jet recording apparatus such as an ink-jet printer and a plotter is provided with an ink-jet recording head unit (hereinafter, referred to as a head unit) which includes an ink-jet recording head capable of ejecting, as ink droplets, ink held in a liquid holding unit such as an ink cartridge and an ink tank.

The head unit includes: an ink-jet recording head having a nozzle line composed of nozzle orifices provided in parallel lines; and a cover head protecting a plane side which ejects ink droplets of the ink-jet recording head. The cover head has: a window frame portion with an opening window portion which exposes the nozzle orifices and which is provided on the plane side that ejects ink droplets of the ink-jet recording head; and a side wall portion which is formed by being bent from the window frame portion toward the side face of the ink-jet recording head. The cover head is fixed by bonding the side wall part to the side face of the ink-jet recording head (please refer to FIG. 3 on p. 4 of JP-A-2002-160376, for example).

Furthermore, when bonding a fixing member such as the cover head and a fixing board to the plurality of the ink-jet recording heads, the bonding is performed by aligning a plate-shaped mask having a reference mark with an alignment mark provided on a nozzle plate. However, since units such as a base jig holding the nozzle plate exist between the mask and the nozzle plate, there is a problem that a distance between the reference mark and the alignment mark increases, and that the precision of alignment decreases.

In addition, if the distance between the mask and the fixing board is shortened by thinning the base jig which holds the fixing member, a stiffness of the base jig decreases. Thus, when fixing the fixing member to the ink-jet recording head, there is a problem that a deformation and a fracture of the base jig are invited, and that it is not possible to perform alignment with high precision.

Note that the problem of this kind naturally exists not only in a method of manufacturing the ink-jet recording head, but also in a method of manufacturing other liquid-jet heads.

FIG. 3 on p. 4 of JP-A-2002-160376 is an example of related art.

SUMMARY

An advantage of some aspects of the invention is that it provides an alignment jig which can improve alignment precision, a manufacturing method thereof, and a method of manufacturing a liquid-jet head unit.

A first aspect of the invention to solve the above issue is an alignment jig including: a base jig which is used when aligning and bonding a nozzle plate which is provided with nozzle orifices for ejecting liquid of a liquid-jet head, with/to a fixing member holding a nozzle plate side of the plurality of the liquid-jet heads, and which is provided with an optical system on a bottom plane; a mask having a transparency, one plane of which is bonded to a plane opposite to the optical system of the base jig, and the other plane of which is provided with a reference mark to be aligned with an alignment mark provided for the nozzle plate; and a spacer jig which is bonded to a plane where the reference mark of the mask is provided and which holds the fixing member.

In the first aspect, it is possible to improve an alignment precision by decreasing a distance between the reference mark of the mask and the alignment mark of the nozzle plate, since the mask is provided on the base jig. In addition, since a fixing screw and the like which protrude and which is for bonding the base jig, the mask and the spacer jig become unnecessary, it is possible to miniaturize the alignment jig. Furthermore, since the base jig does not exist between the mask and the fixing member, there is no need to form the base jig thin. Hence, it is possible to maintain a stiffness of the base jig and to improve the alignment precision.

A second aspect of the invention is in the alignment jig according to the first aspect, wherein the base jig and the mask are bonded with a wax interposed therebetween, as well as the mask and the spacer jig are bonded with a wax interposed therebetween.

In the second aspect, it is possible to reduce a leak of the wax and to bond each member with high adsorbability, as well as to facilitate a disassembly and an assembly of the alignment jig. Therefore, it is possible to easily replace each member of the alignment jig when the member is damaged.

A third aspect of the invention is the alignment jig according to the second aspect, wherein the wax is photo-setting and thermosoftening.

In the third aspect, it is possible to further facilitate the disassembly and the assembly of the alignment jig by using the wax which is photo-setting and thermosoftening.

A fourth aspect of the invention is the alignment jig according to any one of the first to third aspects, wherein a bonding region of the mask and the base jig is a peripheral portion along the periphery of the mask.

In the fourth aspect, it is possible to securely perform alignment without covering the reference mark of the mask or the alignment mark of the nozzle plate with an adhesive agent or a wax.

A fifth aspect of the invention is the alignment jig according to the fourth aspect, wherein a groove portion is provided in the bonding region of the base jig.

In the fifth aspect, it is possible to prevent the adhesive agent, the wax and the like from flowing into a superfluous region such as the reference mark side due to the groove portion, and to securely perform alignment.

A sixth aspect of the invention is the alignment jig according to any one of the first to fifth aspects, wherein a suction unit which suctions and holds the fixing member is connected to the spacer jig.

In the sixth aspect, it is possible to securely suction and hold the fixing member against the spacer jig by use of the suction unit.

A seventh aspect of the invention is the alignment jig according to any one of the first to sixth aspects, wherein an area of the spacer jig is smaller than that of the mask.

In the seventh aspect, it is possible to set the wax by irradiating the wax with light through the mask when bonding the base jig and the mask with the wax interposed therebetween. This is possible by making the area of the spacer jig smaller than that of the mask.

An eighth aspect of the invention is the alignment jig according to any one of the first to seventh aspects, which is provided with a pressing unit for pressing the liquid-jet head against the fixing member side.

In the eighth aspect, it is possible to hold the liquid-jet head in a state of pressing the liquid-jet head against the fixing member by use of the pressing unit, and to securely bond the liquid-jet head to the fixing member.

A ninth aspect of the invention is the alignment jig according to the eighth aspect, wherein the pressing unit is comprised of: a pressing pin; an energizing unit for energizing the pressing pin toward the liquid-jet head side; and a pressing top for pressing the liquid-jet head while uniformly propagating the pressing force of the pressing pin over the liquid-jet head.

In the ninth aspect, it is possible to press the liquid-jet head against the fixing member with uniform pressure within the nozzle plate plane, by pressing the liquid-jet head while propagating the pressing force of the pressing pin by use of the pressing top.

A tenth aspect of the invention is the alignment jig according to any one of the first to ninth aspects, wherein the optical system is provided on a side opposite to the mask of the base jig, for checking the relative positions of the reference mark and the alignment mark.

In the tenth aspect, it is possible to check the positions of the reference mark and the alignment mark by use of the optical system such as a microscope or a CCD camera, while it is possible to suppress an error in the relative positions of the reference mark and the alignment mark by shortening the distance between the reference mark and the alignment mark, even if an optical axis of the optical system is deviated due to a metal halide lamp and the like.

An eleventh aspect of the invention is a method of manufacturing a liquid-jet head unit wherein the plurality of the liquid-jet heads are fixed to the fixing member by use of the alignment jig according to any one of the first to tenth aspects.

In the eleventh aspect, it is possible to realize the liquid-jet head unit in which a liquid-jet characteristic such as a dropping position of an ink droplet is improved.

A twelfth aspect of the invention is a method of manufacturing the alignment jig including: the base jig which is used when aligning and bonding the nozzle plate which is provided with the nozzle orifices for ejecting liquid of the liquid-jet head, with/to a fixing member holding the nozzle plate side of the plurality of the liquid-jet heads, and which is provided on the bottom plane with the optical system for checking the alignment mark provided for the nozzle plate of the liquid-jet head; the mask having a transparency, one plane of which is bonded to a side opposite to the optical system of the base jig, and the other plane of which is provided with the reference mark to be aligned with the alignment mark provided for the nozzle plate; and the spacer jig which is bonded to a plane where the reference mark of the mask is provided and which holds the fixing member, wherein the base jig is arranged in a predetermined position relative to the optical system, while the reference mark of the mask is aligned with a center of the optical system, thus bonding the mask to the base jig.

In the twelfth aspect, since the mask is aligned with the base jig to be bonded with each other, it is possible to decrease a requirement of the processing precision of the mask. Thus, it is possible to reduce the costs, as well as to reduce a dispersion of positions of the reference marks relative to the optical system among the plurality of the alignment jigs. Moreover, since the reference mark of the mask is aligned relatively with the optical system used for aligning the liquid-jet head, the alignment of the optical system with the reference mark becomes unnecessary when using the alignment jig, thus making it possible to simplify operation processes.

A thirteenth aspect of the invention is the manufacturing method of the alignment jig, according to the twelfth aspect, wherein a reference position of the optical system for arranging the base jig is decided based on a master jig which is assembled by aligning the relative positions of the base jig, the mask and the spacer jig.

In the thirteenth aspect, it is possible to manufacture the alignment jig whose alignment is performed in the same way as that of the base jig and the mask of the master jig, thus making it possible to improve the precision of the alignment jig.

A fourteenth aspect of the invention is the manufacturing method of the alignment jig, according to the twelfth and thirteenth aspects, wherein after the mask and a spacer are bonded by irradiating a wax with light from the mask side and setting the wax in a state where the photo-setting and thermosoftening wax is applied to the spacer and where the mask and the spacer are caused to come into contact with each other, the mask is aligned and bonded with/to the base jig, then the photo-setting and thermosoftening wax is injected between the mask and the base jig, and the mask and the base jig are bonded by irradiating the wax with light from the mask side and by setting the wax.

In the fourteenth aspect, it is possible to easily and securely manufacture the alignment jig.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, detailed descriptions will be given of embodiments of the invention.

First Embodiment

Figure 1:
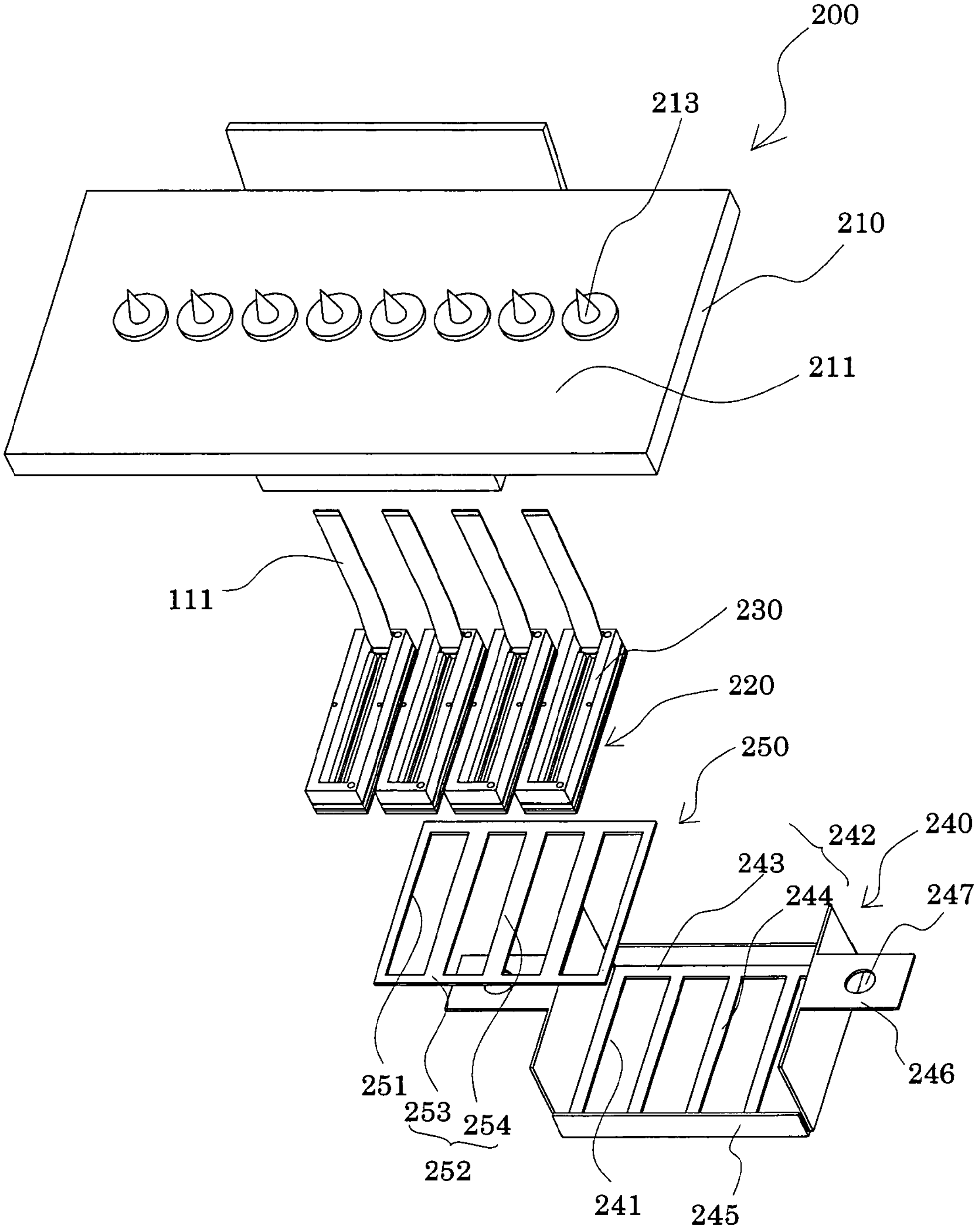
FIG. 1 is an exploded perspective view of a head unit according to a first embodiment.
Figure 2:
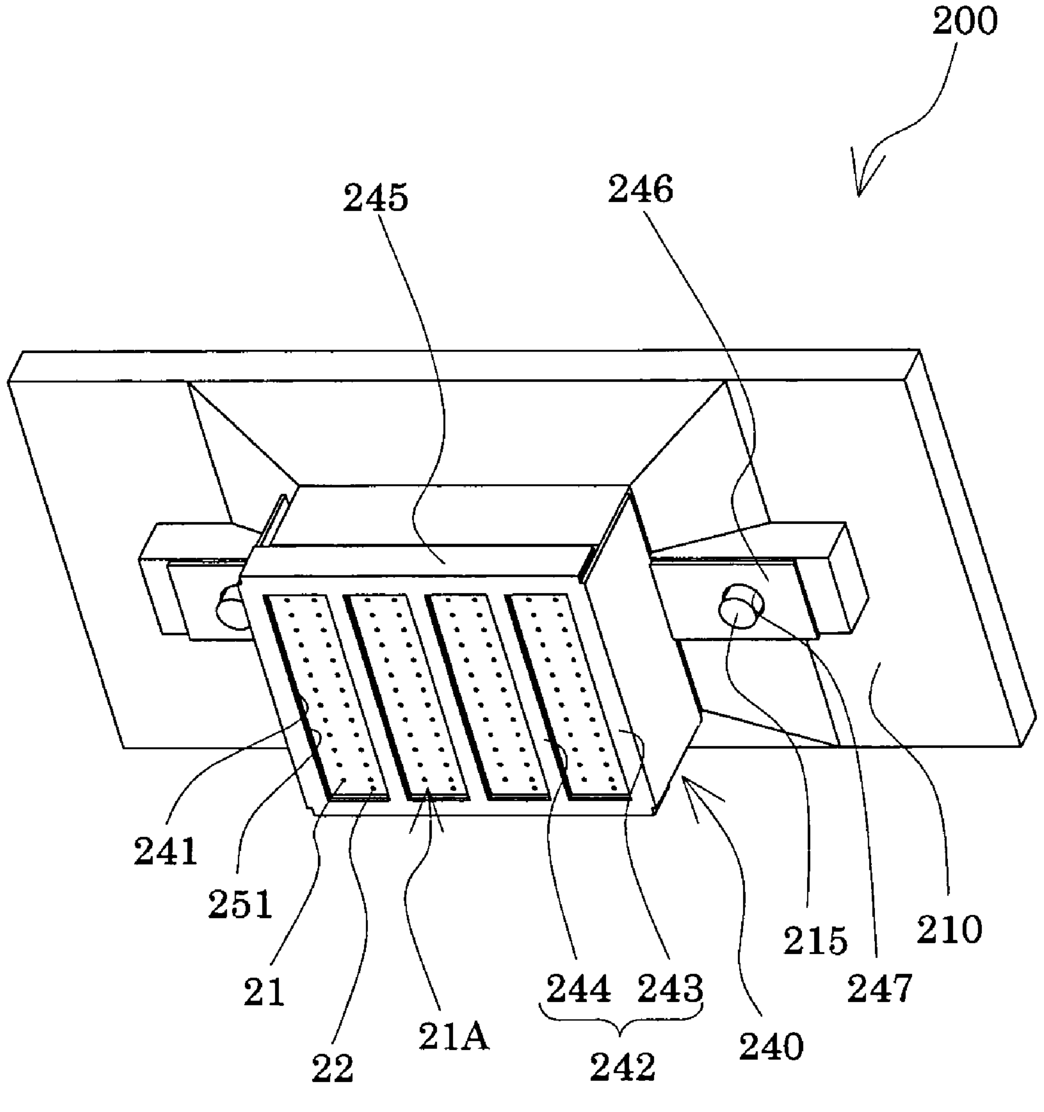
FIG. 2 is an assembly perspective view of the head unit according to the first embodiment.
Figure 3:
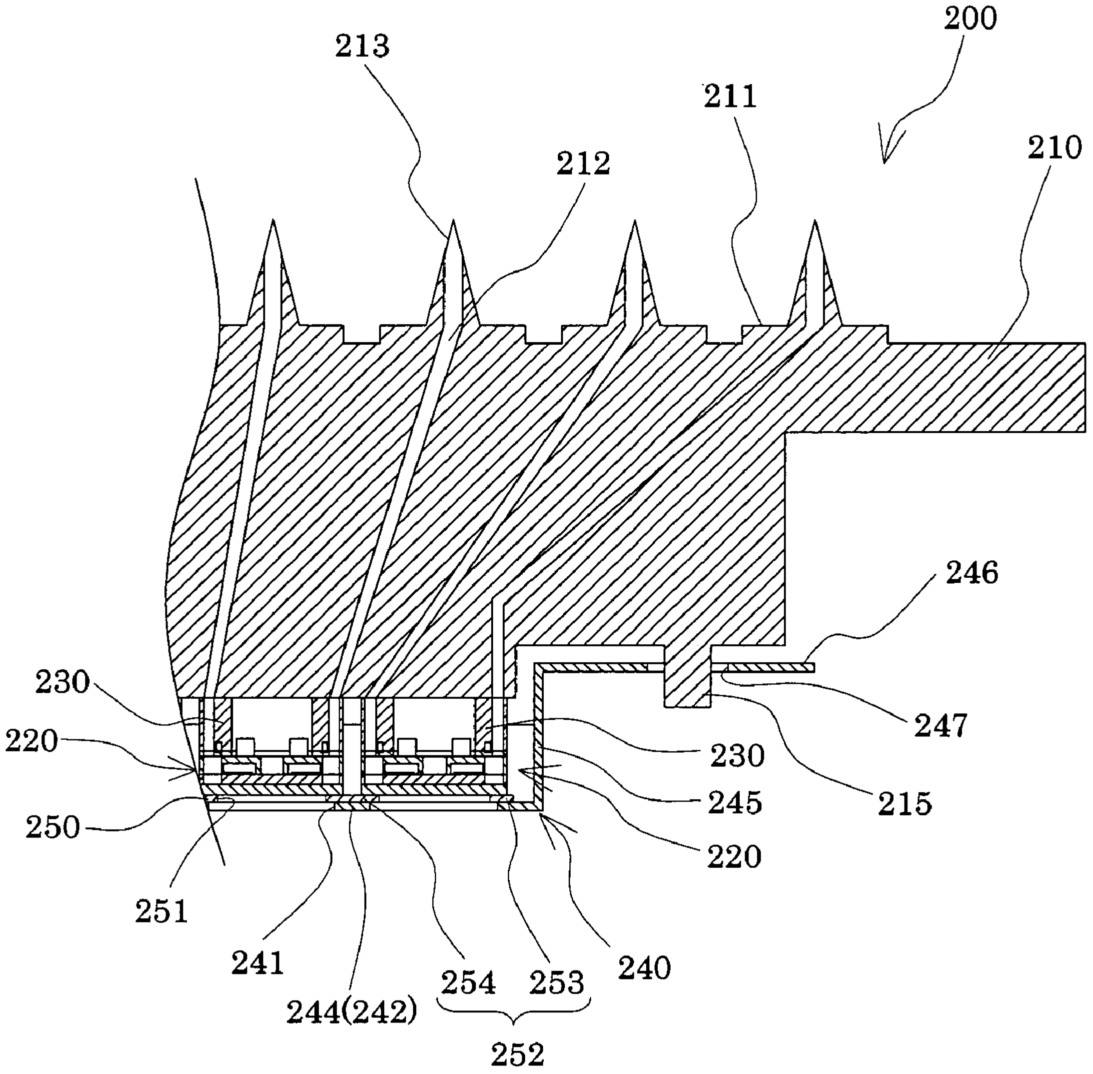
FIG. 3 is a cross-sectional view of a crucial part of the head unit according to the first embodiment.

FIG. 1 is an exploded perspective view of an ink-jet recording head unit according to a first embodiment of the invention, FIG. 2 is an assembly perspective view of the ink-jet recording head unit, and FIG. 3 is a cross-sectional view of its crucial part. As shown in FIG. 1, a cartridge case 210, which is a holding member comprising an ink-jet recording head unit 200 (hereinafter, referred to as the head unit 200), includes a cartridge attachment part 211 to which each ink cartridge (not shown) for supplying ink is attached. For example, in this embodiment, the ink cartridges are comprised of different cartridges in which black ink and three other colors of ink are filled, and the ink cartridges of each color are attached to the cartridge case 210. Moreover, as shown in FIG. 3, on a bottom of the cartridge case 210 a plurality of ink communicating paths 212 are provided whose one ends are opened to each of the cartridge attachment parts 211 and whose other ends are opened to a head case side to be described later. Furthermore, ink supply needles 213, which are inserted in ink supply openings of the ink cartridges, are fixed to opening portions of the ink communicating paths 212 of the cartridge attachment part 211 by filters (not shown) formed in the ink communication paths 212 for removing bubbles and foreign substances in the ink.

In addition, on the bottom of the cartridge case 210, there are a plurality of piezoelectric elements 300 together with a head case 230 to which an ink-jet recording head 220 which ejects liquid droplets from nozzle orifices 21 is fixed on an end face of a side opposite to the cartridge case 210 by a driving force of the piezoelectric elements 300. In the embodiment, the plurality of the ink-jet recording heads 220, which eject each color of ink contained in the ink cartridges, are provided in a manner that the ink-jet recording heads 220 correspond to each color of ink, and a plurality of head cases 230 are also provided independently with each other in a manner that the plurality of the head cases 230 correspond to the respective ink-jet recording heads 220.

Figure 4:
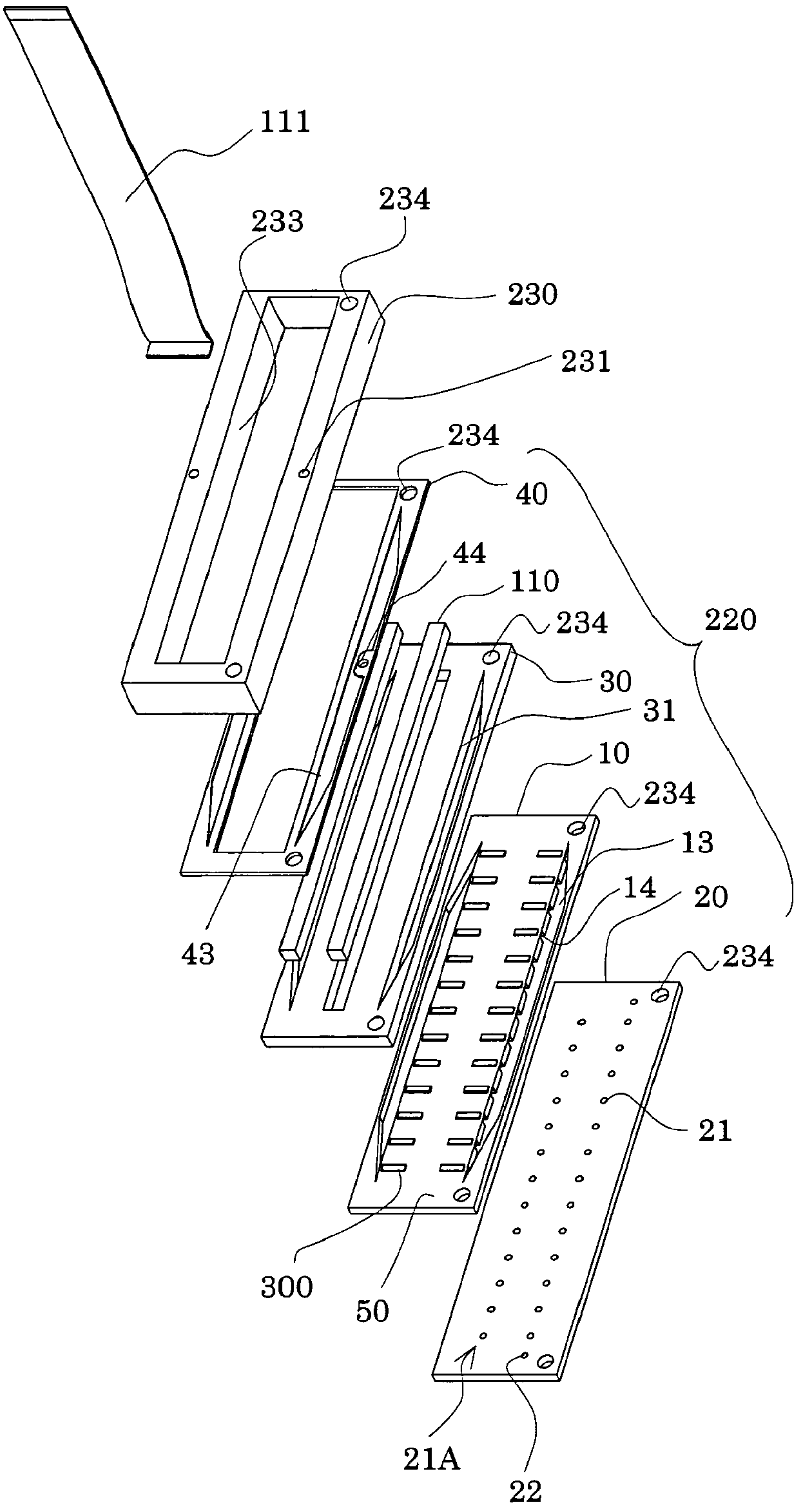
FIG. 4 is an exploded perspective view of the crucial part of the head unit according to the first embodiment.
Figure 5:
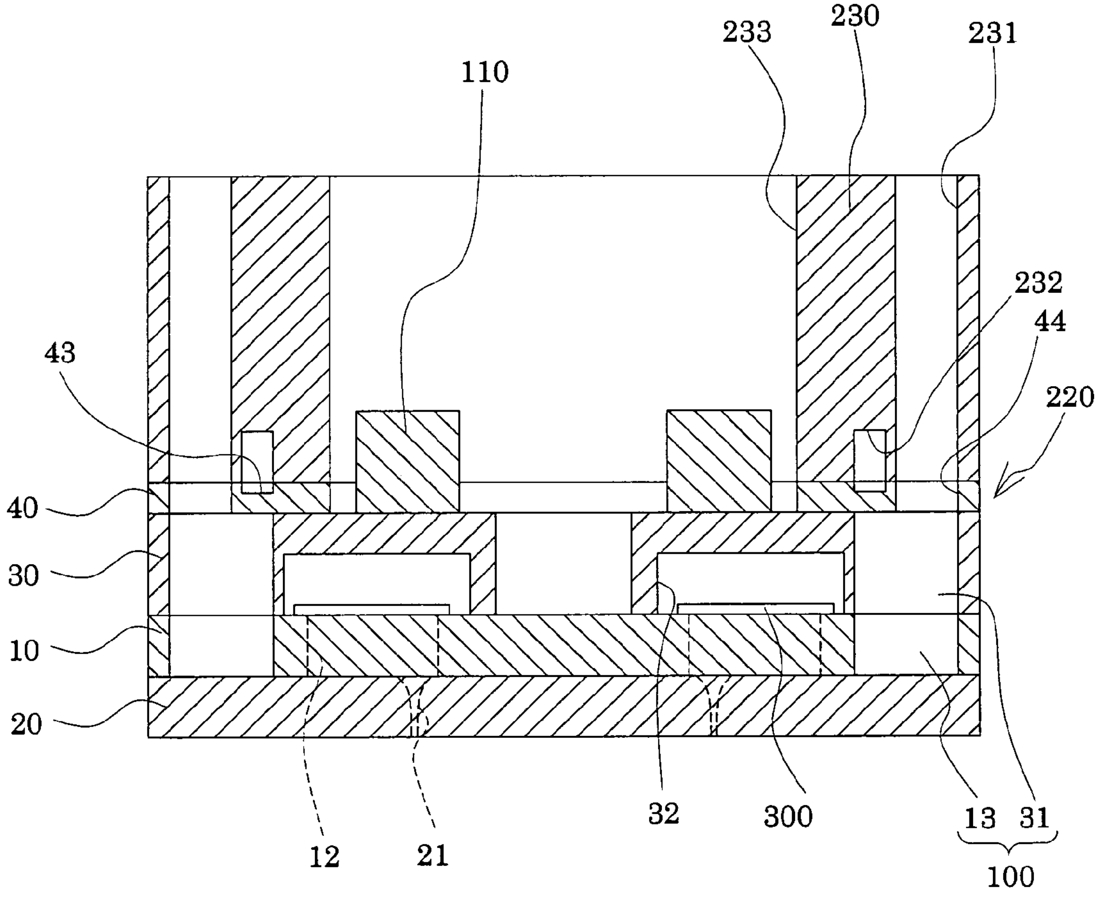
FIG. 5 is a cross-sectional view of a recording head and a head case according to the first embodiment.

Here, descriptions will be given of the ink-jet recording head 220 and the head case 230 of the embodiment, which are mounted on the cartridge case 210. FIG. 4 is an exploded perspective view of the crucial parts of the ink-jet recording head and the head case, and FIG. 5 is a cross-sectional view of the ink-jet recording head and the head case. As shown in FIGS. 4 and 5, a passage-forming substrate 10 comprising the ink-jet recording head 220 is made of a single crystal silicon substrate in the embodiment, and an elastic film 50 made of silicon dioxide, which is previously formed by thermal oxidation, is formed on one plane of the substrate. On the passage-forming substrate 10, pressure generating chambers 12 separated with a plurality of compartment walls are formed in two lines which are provided in parallel in the width direction, by anisotropic etching from the other plane of the substrate. Moreover, in a longitudinal and outer direction of the pressure generating chamber 12 in each line, communicating portions 13 are formed to comprise a reservoir 100 which is to be a common ink chamber of each pressure generating chamber 12, by communicating with a reservoir portion 31 provided on a protective plate 30 which will be described later. In addition, the communication portions 13 are communicated respectively with one end of each pressure generating chamber 12 in the longitudinal direction via the ink supply paths 14.

Furthermore, on the opening portion side of the passage-forming substrate 10, a nozzle plate 20 penetrated by the nozzle orifices 21 which are communicated in a side opposite from the ink supply paths 14 of each pressure generating chamber 12 is firmly attached with an adhesive agent, a thermal welding film and the like. In other words, nozzle lines 21A are provided in two lines together with the nozzle orifices 21 for one ink-jet recording head, in the embodiment. Note that the nozzle plate 20 is made of glass ceramics, a single crystal silicon substrate, stainless steel or the like, whose thickness is, for example, 0.01 to 1 mm and whose coefficient of linear expansion is, for example, 2.5 to 4.5 ($10^{-6}$/° C.) at 300° C. or less. Moreover, alignment marks 22, which are used when aligning with a fixing plate 250 to be described later, are provided on the nozzle plate 20. In the embodiment, two alignment marks 22 are provided at outer sides of the nozzle orifices 21 in a parallel provision direction.

On the other hand, on the opposite side of the opening portion of the passage-forming substrate 10, the piezoelectric elements 300 are formed on the elastic film 50 by sequentially laminating an insulation film 55 made of zirconium oxide, a lower electrode film made of metal, a piezoelectric layer made of lead zirconate titanate (PZT) and the like, and an upper electrode film made of metal. The protective plate 30, which has a reservoir portion 31 comprising at least a part of the reservoir 100, is bonded to the passage-forming substrate 10 where the piezoelectric elements 300 as described above are formed. In the embodiment, the reservoir portion 31 is formed by extending in the width direction of the pressure generating chamber 12, while penetrating the protective plate 30 in the thickness direction. As described above, the reservoir portion 31 comprises the reservoir 100 to be a common ink chamber of each pressure generating chamber 12 by communicating with the communicating portions 13 of the passage-forming substrate 10.

In addition, a piezoelectric element holding portion 32, which has a space to a degree that the movement of the piezoelectric elements 300 is not inhibited, is provided in a region facing the piezoelectric elements 300 of the protective plate 30. The protective plate 30 of this kind may be made of glass, ceramics, metal, plastic, and the like. However, it is preferable to use a material with a thermal expansion coefficient substantially equal to that of the passage-forming substrate 10. In the embodiment, the protective plate 30 is formed by using a single crystal silicon substrate which is the same material as the passage-forming substrate 10.

Moreover, a drive IC 110 for driving each piezoelectric element 300 is provided on the protective plate 30. Each terminal of the drive IC 110 is connected to a leading wire extending out of a separate electrode of each piezoelectric element 300, through an unillustrated bonding wire or the like. Furthermore, each terminal of the drive IC 110 is connected to the outside through an external wiring 111 such as a flexible print cable (FPC) as shown in FIG. 1, and various signals including a print signal are set to be received from the outside through the external wiring 111.

Additionally, a compliance plate 40 is bonded to the protective plate 30 as described above. An ink introducing port 44 for supplying ink in the reservoir 100 is formed in a region facing the reservoir 100 of the compliance plate 40, by penetrating in a thickness direction. Furthermore, a region except the ink introducing port 44 in the region facing the reservoir 100 of the compliance plate 40 is a flexible portion 43 which is formed thin in the thickness direction. The reservoir 100 is sealed by the flexible portion 43. The compliance is given by this flexible portion 43 within the reservoir 100.

In this manner, an ink-jet recording head 220 of the embodiment is composed of four plates, which are the nozzle plate 20, the passage-forming substrate 10, the protective plate 30, and the compliance plate 40. The head case 230 is provided on the compliance plate 40 of the ink-jet recording head 220, the head case 230 being provided with ink supply communicating paths 231 which supply ink from the cartridge case 210 to the ink introducing port 44 by communicating with an ink supply path 212 of the cartridge case 210 as well as communicating with the ink introducing port 44. A concave portion 232 is provided for the head case 230 in a region facing the flexible portion 43 so that the flexible portion 43 may be deformed appropriately. Moreover, the head case 230 is provided with a drive IC holding portion 233, which penetrates in a thickness direction, in a region facing the drive IC 110 provided on the protective plate 30. The external wiring 111 is connected to the drive IC 110 by penetrating the drive IC holding portion 233.

This kind of the ink-jet recording head 220 of the embodiment takes in ink from the ink cartridge, from the ink introducing port 44 through the ink communicating paths 212 and the ink supply communicating paths 231. After filling the insides from the reservoir 100 to the nozzle orifices 21 with ink, the ink-jet recording head 220 follows recording signals from the drive IC 110, and voltage is applied to the piezoelectric elements 300 corresponding respectively to the pressure generating chambers 12. Consequently, the elastic film 50 and the piezoelectric elements 300 are deformed, and thus ink droplets are ejected from the nozzle orifices 21, since the pressure inside each pressure generating chamber 12 is increased.

Pin inserting holes 234 in which pins are inserted to align each member upon assembly are provided in two areas of corners for each member of the ink-jet recording head 220 and the head case 230. Each member is bonded while inserting the pins into the pin inserting holes 234 and performing relative alignment for each member. Thus, the ink-jet recording head 220 and the head case 220 are formed integrally.

Note that the above-mentioned ink-jet recording head 220 is formed by: concurrently forming many chips on one silicon wafer; bonding the nozzle plate 20 and the compliance plate 40 to form one piece; and thereafter separating the plates by each passage-forming substrate 10 of one chip size as shown in FIG. 4.

The four ink-jet recording heads 220 as described above and head cases 230 are fixed to the above-mentioned cartridge case 210 in given intervals in a parallel direction of the nozzle lines 21A. In other words, the head unit 200 of the embodiment is provided with eight nozzle lines 21A. In this manner, by making a plurality of the nozzle lines 21A by use of the plurality of ink-jet recording heads 220, the nozzle lines 21A being comprised of the nozzle orifices 21 provided parallel, it is possible to prevent yields from decreasing, compared with one ink-jet recording head 220 where many nozzle lines 21A are formed. Furthermore, it is possible to increase the number of ink-jet recording heads 220 formed and obtained from one silicon wafer, by using the plurality of ink-jet recording heads 220 in order to provide many nozzle lines 21A, and it is possible to decrease manufacturing costs by reducing a wasteful area of a silicon wafer.

Moreover, the four ink-jet recording heads 220 as described above are aligned and held by the fixing plate 250 which is a common fixing member bonded to ink droplet ejecting surfaces of the plurality of the ink-jet recording heads 220, as shown in FIGS. 1 and 3. The fixing plate 250 is comprised of a flat plate, and includes: exposed opening portions 251 exposing the nozzle orifices 21; a bonding portion 252 which is bonded to at least both edge portions of the nozzle orifices 21 of the ink droplet ejecting plane of the ink-jet recording head 220 as well as separates the exposed opening portions 251.

The bonding portion 252 is comprised of: a frame portion for fixation 253 provided along the periphery of the ink droplet ejecting surface over the plurality of ink-jet recording heads 220; and a beam portion for fixation 254 which is provided by extending between the neighboring ink-jet recording heads 220 and which separates the exposed opening portions 251. The bonding portion 252 composed of the frame portion for fixation 253 and the beam portion for fixation 254 is concurrently bonded to the ink droplet ejecting surfaces of the plurality of the ink-jet recording heads 220. In addition, the frame portion for fixation 253 of the bonding portion 252 is formed in such a manner that it closes the pin inserting holes 234 for aligning each member, upon manufacturing the ink-jet recording heads 220.

As materials of the fixing plate 250 of this kind, for example, metal such as stainless steel, glass ceramics, or single crystal silicon substrate can be cited. Note that it is preferable to use a material with a thermal expansion coefficient equal to that of the nozzle plate 20, for the fixing plate 250. For example, when the nozzle plate 20 is formed of a single crystal silicon substrate, it is preferable that the fixing plate 250 is formed of a single crystal silicon substrate.

Furthermore, it is preferable that the fixing plate 250 is formed to be thin, and that it is formed thinner than a cover head 240 to be described later. This is because, for example, if the fixing plate 250 is made to be thick, it is difficult to increase the alignment precision since a distance between a reference mark 401 of an alignment jig 400 used when aligning the fixing plate 250 and the alignment mark 22 provided on the nozzle plate 20 of the ink-jet recording head 220 becomes large. An additional reason is that ink is liable to remain in areas such as those between the beams portion for fixation 254 when wiping the ink droplet ejecting surface of the nozzle plate 20. In other words, if the fixing plate 250 is formed thin, it is possible to perform alignment easily and very precisely by decreasing the distance between the alignment mark 22 of the ink-jet recording head 220 and the reference mark 401 of the alignment jig 400 to be described in detail later. It is also possible to prevent ink from remaining on the ink droplet ejecting surface of the nozzle plate 20 upon wiping the ink droplet ejecting surface of the nozzle plate 20. Incidentally, the fixing plate 250 is 0.1 mm thick in the embodiment. Moreover, a method of bonding the fixing plate 250 and the nozzle plate 20 is not particularly limited, and, for example, bonding with a thermosetting epoxy adhesive, an ultraviolet curing adhesive or the like can be cited.

In this manner, since the fixing plate 250 blocks areas between the neighboring ink-jet recording heads 220 with the beam portion for fixation 254, the ink does not enter in the areas between the neighboring ink-jet recording heads 220. Thus, it is possible to prevent a degradation or a fracture of the piezoelectric elements 300 and the drive IC 110 and the like by the ink of the ink-jet recording head 220, the degradation or the fracture being caused by the ink. Additionally, there is no gap between the ink droplet ejecting surface of the ink-jet recording head 220 and the fixing plate 250 since they are bonded with an adhesive agent. Therefore, it is possible to prevent a recorded medium from entering into the gap and to prevent the deformation of the fixing plate 250 and paper jam.

Moreover, since the four ink-jet recording heads 220 are aligned and fixed to the fixing plate 250 of this kind, it is possible to perform such alignment of the ink-jet recording head 220 with the fixing plate 250 by using the alignment jig. Here, detailed descriptions will be given of the alignment jig. Note that FIGS. 6A and 6B are cross-sectional views showing the alignment jig.

Figure 6A:
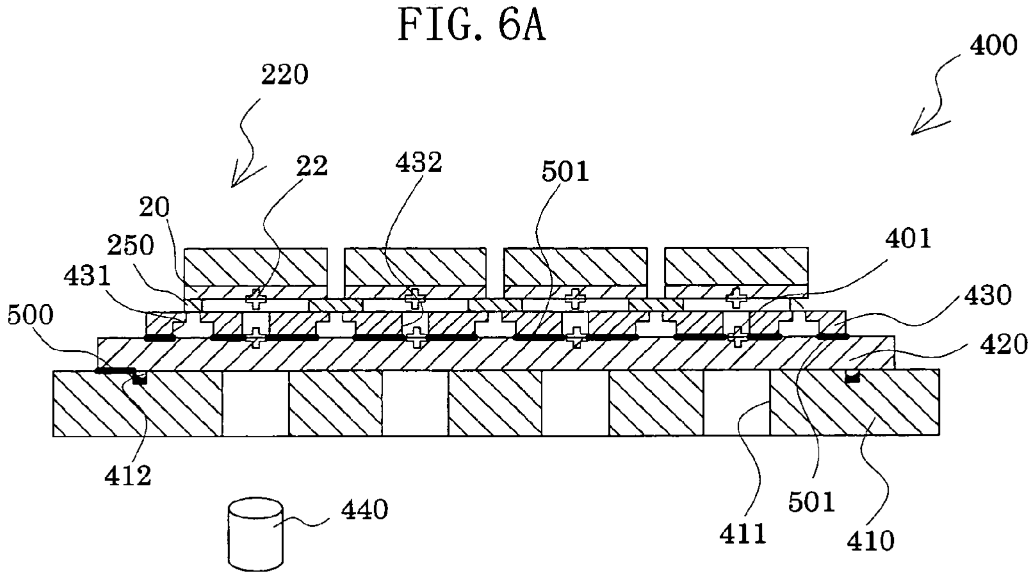
FIGS. 6A and 6B are cross-sectional views of an alignment jig according to the first embodiment.
Figure 6B:
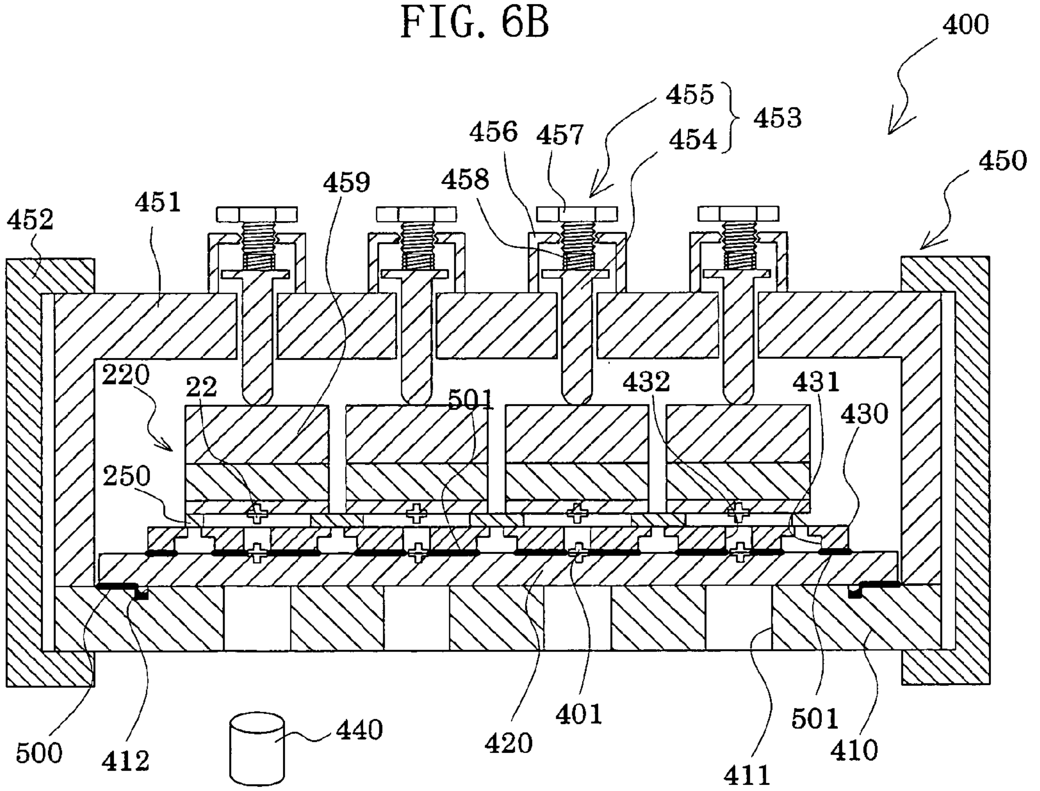
Figure 6C:
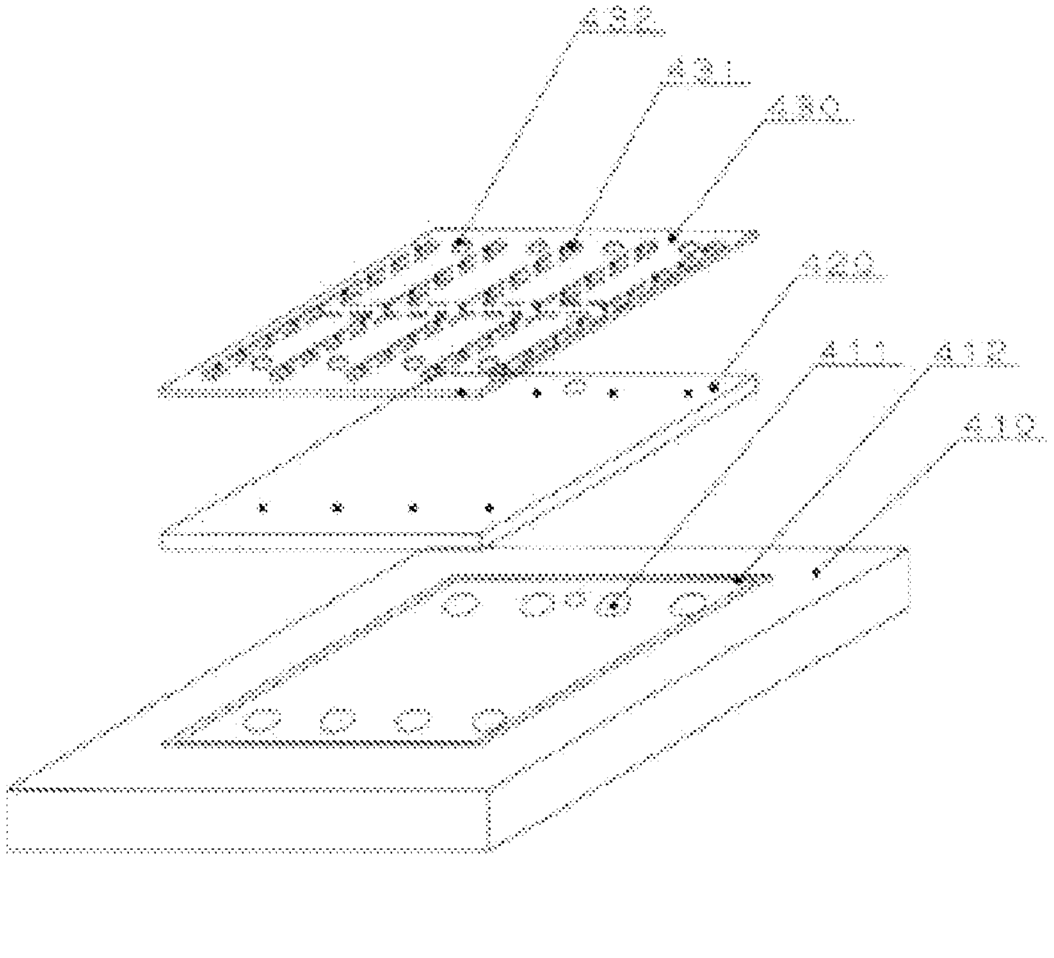
FIG. 6C illustrates a perspective view of an alignment jig shown in FIGS. 6A and 6B, according to an exemplary embodiment.

As shown in FIG. 6A, the alignment jig 400 includes: a base jig 410; a mask 420, one plane of which is bonded to the base jig 410 and the other plane of which is provided with the reference mark 401; a spacer jig 430 which is bonded to the reference mark 401 side of the mask 420; and an optical system 440 such as a CCD camera, a microscope and the like, provided on a bottom plane of the base jig 410 for checking the reference mark 401 and the alignment mark 22 of the nozzle plate 20. The alignment jig 400 is designed in a way that: the fixing plate 250 is held on the spacer jig 430; the reference mark 401 of the mask 420 is aligned with the alignment mark 22 provided for the nozzle plate 20 of the ink-jet recording heads 220; and the nozzle plates 20 of the plurality of the ink-jet recording heads 220 are bonded to the fixing plate 250 with an adhesive agent interposed therebetween.

Specifically, the base jig 410, which is made of metal such as stainless steel and is plate-shaped, is provided with a penetrated hole 411 penetrating in a thickness direction in a region facing a region where the reference mark 401 of the mask 420 is provided. Due to this penetrated hole 411, it is possible to check the reference mark 401 of the mask 420 and the alignment mark 22 of the nozzle plate 20 by viewing through the mask 420 from a bottom plane side by use of the optical system 440.

The mask 420 is made of a material having a transparency, for example, glass such as quartz, in the embodiment. Moreover, the area of the mask 420 is smaller than that of the base jig 410. That is, the peripheral portion of the base jig 410 is provided, in a manner that the peripheral portion extends to an area outside of the periphery of the mask 420.

Furthermore, one plane of the mask 420 is bonded to an upper surface, which is a side opposite to the optical system 440 of the base jig 410, with, for example, a thermosetting epoxy adhesive agent, an ultraviolet curing adhesive agent, a photo-setting and thermosoftening wax or the like interposed therebetween. In the embodiment, when each part of the alignment jig 400 is damaged, it is possible to facilitate a disassembly and an assembly of the alignment jig 400 and a replacement of the damaged parts by bonding the mask 420 to the base jig 410 with a wax 500 interposed therebetween.

Additionally, by bonding the mask 420 to the base jig 410 with the wax 500 leakage interposed therebetween, it is possible to further reduce leakage of the wax 500, compared with a case in which an face seal or the like are used. Consequently, it is possible to bond the mask 420 and the base jig 410 with high adsorbability.

Moreover, a bonding area of the base jig 410 and the mask 420 is a peripheral portion of the mask 420 in the embodiment. A groove portion 412 is provided in a region where the peripheral portions of the mask 420 and the base jig 410 come into contact with each other. A region between the groove portion 412 and the region where the peripheral portions of the mask 420 and the base jig 410 come into contact, are set to be a bonding region. Therefore, the groove portion 412 prevents the wax 500 for bonding the base jig 410 and the mask 420 from flowing into the groove portion 412. The groove portion also prevents the wax 500 from flowing into a superfluous region such as a region facing the reference mark 401 and an inside of the penetrated hole 411, and from making it impossible to check the reference mark 401 and the like by use of the optical system 440.

In addition, the reference mark 401 is provided to be aligned with the alignment mark 22 of the nozzle plate 20 on a plane opposite to a plane which is bonded to the base jig 410 of the mask 420. In the embodiment, two alignment marks 22 are provided for the nozzle plate 20 of the ink-jet recording head 220. Two reference marks 401 are provided for each ink-jet recording head 220 for fixing four ink-jet recording heads 220 to the fixing plate 250, which means eight reference marks 401 in total.

The spacer jig 403, which is made of metal such as stainless steel and is plate-shaped, is bonded to the plane where the reference mark 401 of the mask 420 is provided. It is possible to bond the mask 420 and the spacer jig 430 by use of, for example, a thermosetting epoxy adhesive agent, an ultraviolet curing adhesive agent, a photo-setting and thermosoftening wax 501 or the like. In the embodiment, it is possible to facilitate the disassembly and the assembly of the alignment jig 400 by bonding the mask 420 and the base jig 410 with the wax 501 interposed therebetween, when each member of the alignment jig 400 is damaged. Therefore, it is possible to replace the damaged parts easily.

Furthermore, by bonding the mask 420 and the spacer jig 430 with the wax 501 interposed therebetween, it is possible to further reduce leakage of the wax 501, compared with a case in which a face seal or the like are used. Consequently, it is possible to bond the mask 420 and the space jig 430 with high adsorbability.

The spacer jig 430 is formed with a smaller area than that of the mask 420, and the peripheral portion of the mask 420 is a region which is not covered with the spacer jig 430. Additionally, the region of the mask 420 which is not covered with the spacer jig 430 is a bonding region in which the mask 420 and the base jig 410 are bonded. In other words, since the mask 420 is bonded to the base jig 410 with the wax 501 which is photo-setting and thermosoftening in the embodiment, the wax 501 is capable of being set to bond the mask 420 and the base jig 410 in a state where the mask 420 comes into contact with the base jig 410, the wax 501 is injected from the periphery of the mask 420, and the wax 501 is then irradiated with light through the mask 420 from the region of the mask 420 which is not covered with the spacer jig 430.

Moreover, the spacer jig 430 is provided with a suction chamber 431 which is connected to an unillustrated suction unit such as a suction pump. The suction chamber 431 is opened to a surface of the spacer jig 430, and is designed to suction and hold the surface of the fixing plate 250.

Furthermore, the spacer jig 430 is provided with a communicating hole 432 which penetrates in a thickness direction in a region facing the reference mark 401 of the mask 420. The spacer jig 430 is designed in a way that the optical system 440 can check the alignment mark 22 of the ink-jet recording head 220 which is suctioned and held by the spacer jig 430 through the communicating hole 432 from the bottom plane side of the mask 420. In addition, by providing the communicating hole 432 for the spacer jig 430, the wax is prevented from flowing onto the reference mark 401 and then making it impossible to check the reference mark 401 by the optical system 440 when bonding the mask 420 to the spacer jig 430.

Since the mask 420 is bonded onto the base jig 410 in the alignment jig 400 of this kind, the distance between the reference mark 401 of the mask 420 and the alignment mark 22 of the nozzle plate 22 is shortened. Thus, it is possible to improve an alignment precision. Additionally, since the base jig 410, the mask 420 and the spacer jig 430 are bonded to be formed in one piece, a fixing screw and the like, which protrude, become unnecessary, thus making it possible to realize miniaturization of the alignment jig 400. Moreover, since there is not the base jig between the mask 420 and the fixing member, there is no need to form the base jig 410 thin. Hence, it is possible to maintain the stiffness of the base jig 410 and to improve the alignment precision.

Note that the alignment jig 400 of the embodiment is provided with a pressing unit 450 for pressing the ink-jet recording head 220 against the fixing plate 250 side in a manner that the pressing unit 450 is freely detachable and attachable, as shown in FIG. 6B.

Specifically, the pressing unit 450 includes: a U-shaped arm portion 451 arranged on the ink-jet recording head 220, both edges of which are mounted on the base jig 410; a clipping portion 452 which holds the arm portion 451 in a manner that the arm portion 451 is freely attached and detached to/from the base jig 410, by clipping the arm portion 451 and the base jig 410; and a pressing portion 453 which is provided for the arm portion 451 and presses each ink-jet recording head 220 against the fixing plate 250 side.

The pressing portion 453 is provided respectively in a region facing each ink-jet recording head 220 of the arm portion 451. Since four ink-jet recording heads 220 are fixed to one fixing plate 250 in the embodiment, four pressing portions 453 are provided in the same number of the ink-jet recording heads 220.

The pressing portion 453 is comprised of: a pressing pin 454 having a column shape which is inserted into the arm portion 451 and which is provided in a manner that it is freely movable in an axis direction; an energizing unit 455 provided on the base portion of the pressing pin 454 for energizing the pressing pin 454 to the ink-jet recording head 220 side; and a pressing top 459 arranged between the pressing pin 454 and the ink-jet recording head 220.

The end of the pressing pin 454 is formed in a dome shape and is to press by making a point contact on the pressing top 459.

The energizing unit 455 is provided for the arm portion 451 to energize the pressing pin 454 to the ink-jet recording head 220. In the embodiment, the energizing unit 455 includes: a screw holding portion 456 provided in a manner that it surrounds the base side of the pressing pin 454; a screw portion 457 spirally fitted to the screw holding portion 456; and an energizing spring 458 provided between the end surface of the screw portion 457 and the base portion of the pressing pin 454.

The energizing unit 455 of this kind is capable of adjusting the pressing pressure of the pressing pin 454 pressed by the energizing spring 458 by the amount of tightening against the screw holding portion 456 of the screw portion 457. Due to this, it is possible to adjust each pressing pressure with which the pressing pins 454 press the pressing tops 459.

The pressing top 459 is arranged between the pressing pin 454 and the protective plate 30 of the ink-jet recording head 220, and the pressing pin 454 makes a point contact on the upper surface of the pressing top 459. The pressing top 459 is capable of pressing the ink-jet recording head 220 in a state where the pressing pressure of the pressing pin 454 is uniformly propagated almost all over the protective plate 30 of the ink-jet recording head 220. The whole part of the ink-jet recording head 220 is pressed by use of the pressing top 459 in a way better than when the end of the pressing pin 454 is directly contacted onto the protective plate 30 of the ink-jet recording head 220. Thus, it is possible to securely fix the ink-jet recording head 220 to the fixing plate 250. Note that the pressing top 459 has a form whose periphery is as large as, or a little smaller than that of the protective plate 30 of the ink-jet recording head 220.

The clipping portion 452 is for holding the pressing unit 450 in a manner that the pressing unit 450 is freely attached and detached to/from the base jig 410, by clipping the arm portion 451 and the base jig 410. It is possible to excellently perform the arrangement and the alignment of the ink-jet recording head 220, by causing the pressing unit 450 to be freely attached and detached to/from the base jig 410 in this manner.

Moreover, the clipping portion 452 is designed to be capable of removing the pressing unit 450 from the base jig 410, while clipping the base jig 410 and the arm portion 451. For this reason, it is possible to use the pressing unit 450 for another base jig 410, the mask 420 and the spacer jig 430.

Here, descriptions will be given of a method of manufacturing the alignment jig 400 of this kind. Incidentally, FIGS. 7A to 7E are cross-sectional views showing the method of manufacturing the alignment jig.

Figure 7A:
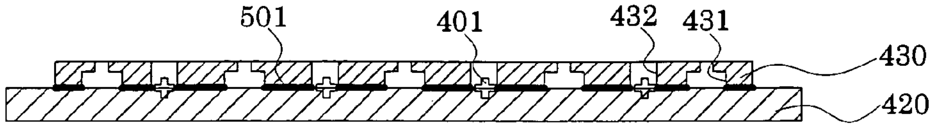
FIGS. 7A to 7E are cross-sectional views showing processes of manufacturing the alignment jig according to the first embodiment.

As shown in FIG. 7A, the wax 501 is transferred to one plane of the spacer jig 430, and the spacer jig 430 is caused to come into contact with the mask 420.

Figure 7B:
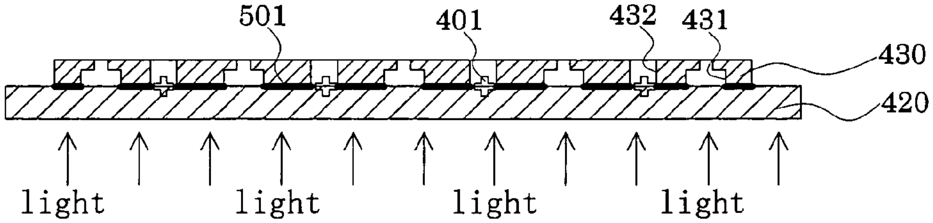

Next, as shown in FIG. 7B, the wax 501 is irradiated with light through the mask 420 from the side opposite to the spacer jig 430 of the mask 420, thus being set to bond the mask 420 and the spacer jig 430.

Figure 7C:
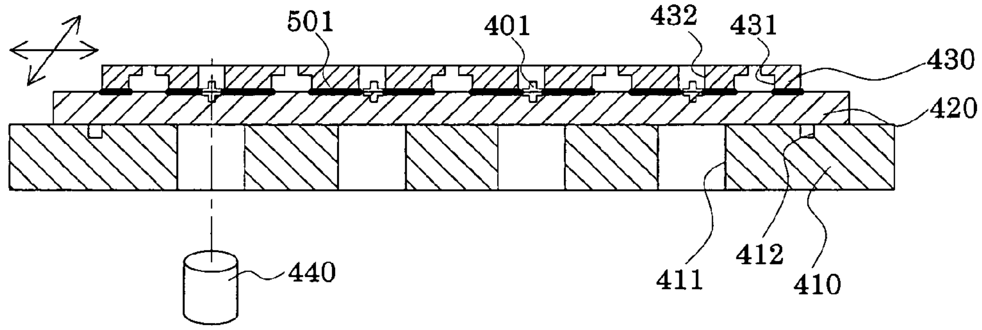

Then, as shown in FIG. 7C, the base jig 410 is arranged in a predetermined position relative to the optical system 440 for aligning the ink-jet recording head 220. The reference mark 401 of the mask 420 is aligned with a center of the optical system 440 in a state where the base jig 410 comes into contact with the mask 420. At this point, it is preferable that the center of the optical system 440 is aligned with the reference mark 401 of the master jig which is assembled while aligning, for example, the base jig 410, the mask 420 and the spacer jig 430 with high precision. For this reason, it is possible to prevent the positions of the penetrated hole 411 of the base jig 410, the communicating hole 432 of the spacer jig 430 and the like, and the position of the reference mark 401 of the mask 420, from deviating from each other, when assembling the alignment jig 400.

Note that it is possible to make slight adjustments in such alignment of the mask 420 by use of, for example, an unillustrated micrometer. Naturally, the reference mark 401 and the center of the optical system 440 may automatically be aligned by driving of the micrometer with a drive motor and the like, by processing images taken by the optical system 440 and the like, with use of a CCD camera as the optical system 440.

Figure 7D:
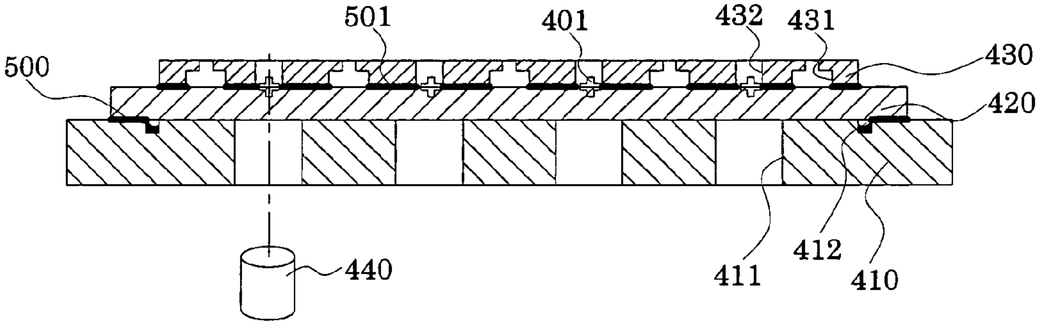

Next, as shown in FIG. 7D, the wax 500 is injected between the mask 420 and the base jig 410. The wax 500 is injected along the periphery of the mask 420. At this point, since the groove portion 412 is provided for the base jig 410, the extra wax 500 flows into the groove portion 412 and it is possible to prevent the wax 500 from flowing into a superfluous region such as a region facing the reference mark 401. Additionally, this region where the wax 500 is injected is the region of the mask 420 which is not covered with the spacer jig 430.

Figure 7E:
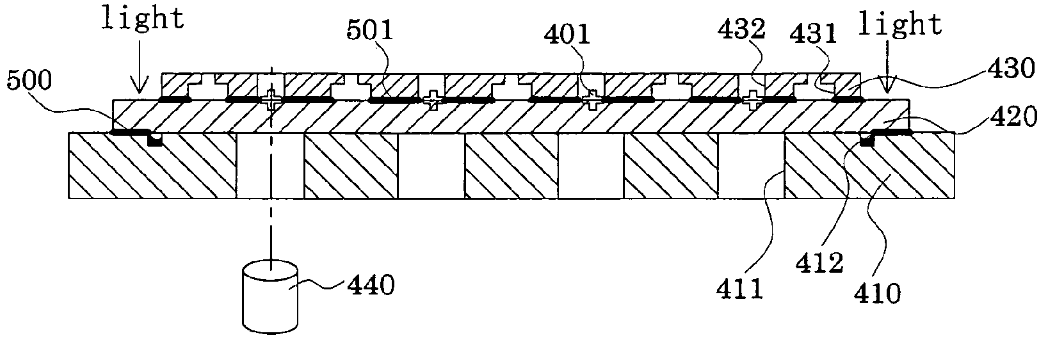

Subsequently, as shown in FIG. 7E, the wax 500 is irradiated with light through the region of the mask 420 which is not covered with the spacer jig 430, thus the wax 500 being set. In this manner, the mask 420 is bonded to the base jig 410. For this reason, the base jig 410, the mask 420 and the spacer jig 430 are bonded to form an integrated alignment jig 400 by use of the waxes 500 and 501.

In this manner, by aligning and bonding the base jig 410 with/to the mask 420 by use of the optical system 440 used when aligning the fixing plate 250 with the ink-jet recording head 220, it is possible to always align the reference mark 401 with the center of the optical system 440 only by arranging the alignment jig 400 in a predetermined position relative to the optical system 440 when the ink-jet recording head 220 is aligned with the fixing plate 250. For this reason, when the ink-jet recording head 220 is bonded to the fixing plate 250 to manufacture the head unit 200, it is possible to improve working efficiency by simplifying operation processes.

Furthermore, it is possible to always align the reference mark 401 of each alignment jig 400 with the center of the optical system 440 by forming the plurality of alignment jigs 400 in the above-mentioned manufacturing processes, only if the alignment jigs 400 are arranged in predetermined positions relative to the optical system 440. For this reason, there is no need to align the center of the optical system 440 with the reference mark 401 whenever replacing the alignment jig 400, thus improving working efficiency.

Descriptions will be given of a method of manufacturing the head unit by use of the alignment jig 400 of this kind, with reference to FIGS. 6A to 8C. Note that FIGS. 8A to 8C are plan views from the bottom plane side of the mask showing the method of manufacturing the head unit.

Figure 8A:
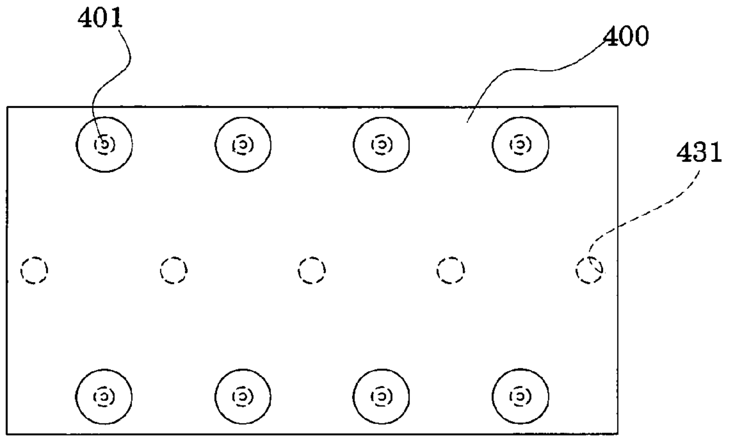
FIGS. 8A to 8C are plan views showing processes of manufacturing the head unit according to the first embodiment.

As shown in FIG. 8A, the base jig 410 is arranged in a predetermined position relative to the optical system 440. At this point, since the reference mark 401 of the alignment jig 400 is aligned with the optical axis of the optical system 440, there is no need to align the optical, system 440 with the reference mark 401, thus making it possible to simplify operation processes.

Figure 8B:
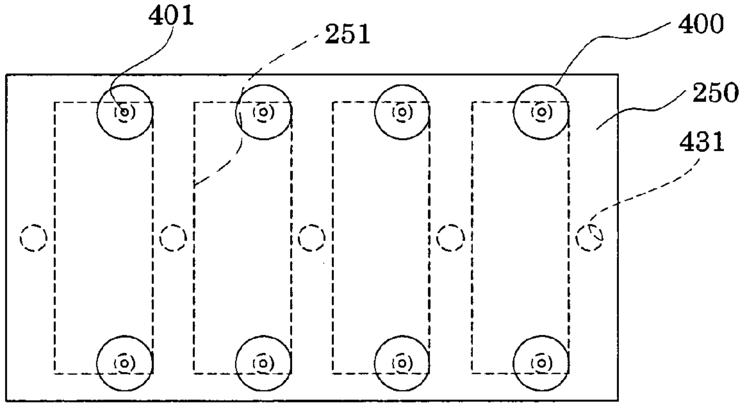

Next, as shown in FIG. 8B, the fixing plate 250 is held by the alignment jig 400. Specifically, the fixing plate 250 is held by the spacer jig 430 of the alignment jig 400. At this point, the fixing plate 250 is suctioned and held by the spacer jig 430 with the suction chamber 431, as described above. Note that it is possible to align the spacer jig 430 with the fixing plate 250, by, for example, inserting a pin into the penetrated holes provided for the spacer jig 430 and the fixing plate 250.

Figure 8C:
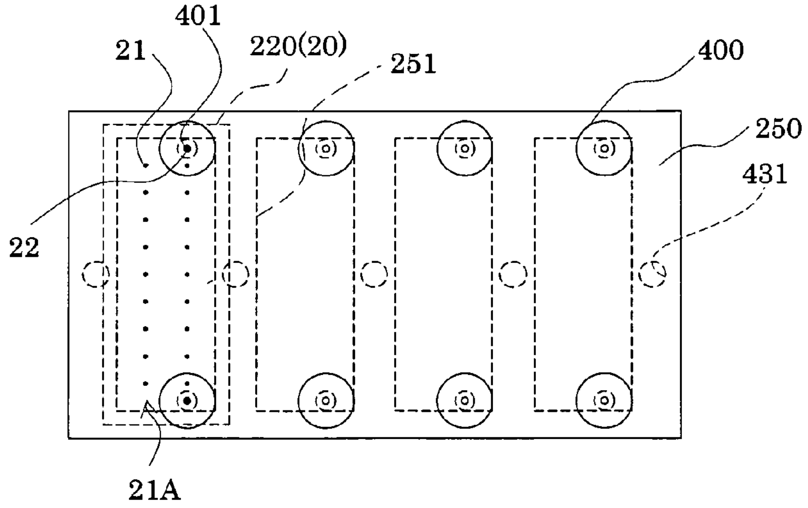

Then, as shown in FIG. 8C, the ink-jet recording head 220 is caused to come into contact with the fixing plate 250 with an adhesive agent interposed therebetween. At this point, the ink-jet recording head 220 is caused to come into contact with the fixing plate 250 with the adhesive agent interposed therebetween, while the alignment mark 22 provided for the nozzle plate 20 of the ink-jet recording head 220 is aligned with the reference mark 401 of the mask 420 by use of the optical system 440. In other words, since the fixing plate 250 is held by being aligned with the alignment jig 400, it is possible to align the fixing plate 250 with the ink-jet recording head 220 by aligning the mask 420 with the ink-jet recording head 220.

Note that it is possible to make slight adjustments in aligning the ink-jet recording head 220 with the fixing plate 250 of, by use of, for example, an unillustrated micrometer or the like. Naturally, the reference mark 401 may automatically be aligned with the alignment mark 22 by driving of the micrometer with a drive motor or the like, by processing images taken by the optical system 440 by use of a CCD camera as the optical system 440.

Since the mask 420 is provided on the side opposite to the optical system 440 of the base jig 410 upon alignment by the alignment jig 400 in this manner, it is possible to shorten the distance between the reference mark 401 of the mask 420 and the alignment mark 22 of the nozzle plate 20. For this reason, it is possible to perform alignment easily and in short time with high precision.

Furthermore, for example, if the ink-jet recording head 220 is directly fixed to the cover head 240, the cover head 240 cannot be formed with a thin material, since the ink-jet recording head 220 should be protected from impacts such as capping and wiping. Therefore, the distance between the reference mark of the mask and the mark of the nozzle plate 20 of the ink-jet recording head 220 increases. In the embodiment, since the ink-jet recording head 220 is not bonded directly to the cover head 240, but it is bonded to the fixing plate 250, it is possible to form the fixing plate 250 thin, thus making it possible to decrease the distance between the reference mark 401 and the alignment mark 22. Consequently, it is possible to perform alignment of the fixing plate 250 and the ink-jet recording head 220 easily and highly precisely.

Thereafter, by repeating the processes shown in FIG. 8C, the plurality of the ink-jet recording heads 220 are sequentially aligned with the fixing plate 250. As a result, it is possible to bond the plurality of the ink-jet recording heads 220 to the fixing plate 250, by setting the adhesive agent while pressing the plurality of the ink-jet recording heads 220 against the fixing plate 250 with a predetermined pressure by use of the pressing unit 450 shown in the above-described FIG. 6B.

By aligning and bonding the fixing plate 250 with/to the plurality of the ink-jet recording heads 220 in this manner, it is possible to perform alignment of the fixing plate 250 and the nozzle lines 21A with high precision. In addition, it is possible to very precisely perform relative alignment between each nozzle line 21A of the neighboring ink-jet recording heads 220. Moreover, since the ink-jet recording head 220 is caused to come into contact with and bonded to the fixing plate 250 formed of a flat plate, relative alignment is performed in an ink droplet ejecting direction for the plurality of the ink-jet recording heads 220 only by bonding the ink-jet recording heads 220 to the fixing plate 250. For this reason, there is no need to perform alignment of the plurality of the ink-jet recording heads 220 in the ink droplet ejecting direction. Therefore, it is possible to reliably avoid errors in the dropping position of ink droplets.

On the other hand, the head unit 200 is provided with the cover head 240 having a box shape in a manner that the cover head 240 covers the plurality of the ink-jet recording heads 220, on the side of the fixing plate 250 opposite to the ink-jet recording head 220, as shown in FIGS. 1 and 2. The cover head 240 includes: a fixing portion 242 which is provided with an opening portion 241 in a way that the opening portions 241 correspond to the exposed opening portion 251 of the fixing plate 250; and a side wall portion 245 which is provided on a side face of the ink droplet ejecting plane of the ink-jet recording head 220 in a manner that the wall portion 245 bends along the periphery of the fixing plate 250.

In the embodiment, the fixing portion 242 is comprised of: a frame portion 243 which is provided corresponding to the frame portion for fixation 253 of the fixing plate 250; and a beam portion 244 which is provided, corresponding to the beam portion for fixation 254 of the fixing plate 250 and which separates the opening portions 241. In addition, the fixing portion 242 comprised of these kinds of the frame portion 243 and the beam portion 244 is bonded to the bonding portion 252 of the fixing plate 250.

Since the ink droplet ejecting surface of the ink-jet recording head 220 is bonded to the cover head 240 without gaps therebetween in this manner, it is possible to prevent a recorded medium from entering into the gaps and to prevent a deformation of the cover head 240 and a paper jam. Furthermore, it is possible to securely prevent ink from going around to the side face of the ink-jet recording head 220, by causing the side wall portion 245 of the cover head 240 to cover peripheral edges of the plurality of the ink-jet recording heads 220.

As the cover head 240 of this kind, for example, a metal material such as stainless steel can be cited. A metal plate may be formed by press working or by molding. Moreover, it is possible to ground the cover head 240 by using a conductive metal material for the cover head 240. Furthermore, the cover head 240 is required to have strength to a certain extent in order to protect the ink-jet recording head 220 from impact such as wiping or capping. Therefore, the cover head 240 is required to be relatively thick. Note that the thickness of the cover head 240 is 0.2 mm in the embodiment.

Incidentally, the bonding of the cover head 240 and the fixing plate 250 is not particularly limited. For example, the bonding with a thermosetting epoxy adhesive agent can be cited.

Furthermore, the fixing portion 242 is provided with a flange portion 246 where a fixing hole 247 is provided for aligning and fixing the cover head 240 with/to other members. The flange portion 246 is provided by being bent in a manner that it protrudes in the same direction as a plane direction of the ink droplet ejecting surface from the side wall portion 245. As shown in FIGS. 2 and 3, the cover head 240 is fixed to the cartridge case 210 which is a holding member that holds the ink-jet recording head 220 and the head case 230 in the embodiment.

Specifically, as shown in FIGS. 2 and 3, the cartridge case 210 is provided with a protrusion 215 which protrudes to the ink droplet ejecting plane side and which is inserted in the fixing hole 247 of the cover head 240. The cover head 240 is fixed to the cartridge case 210, by heating and crimping the end of the protrusion 215 as well as inserting the protrusion 215 in the fixing hole 247 of the cover head 240. It is possible to align the cover head 240 in the plane direction of the ink droplet ejecting surface to fix the cover head 240 to the cartridge case 210, by setting this kind of the protrusion 215 provided for the cartridge case 210 to have an external diameter which is smaller than the fixing hole 247 of the flange portion 246.

In addition, the cover head 240 of this kind and the fixing plate 250 where the plurality of the ink-jet recording heads 220 are bonded are fixed by aligning the fixing hole 247 of the cover head 240 with the plurality of the nozzle lines 21A. Here, although it is possible to align the fixing hole 247 of the cover head 240 with the plurality of the nozzle lines 21A by use of the above-described alignment jig 400, the cover head 240 may be simultaneously aligned and fixed when the fixing plate 250 is aligned and fixed with/to the plurality of the ink-jet recording heads 220.

Figure 9:
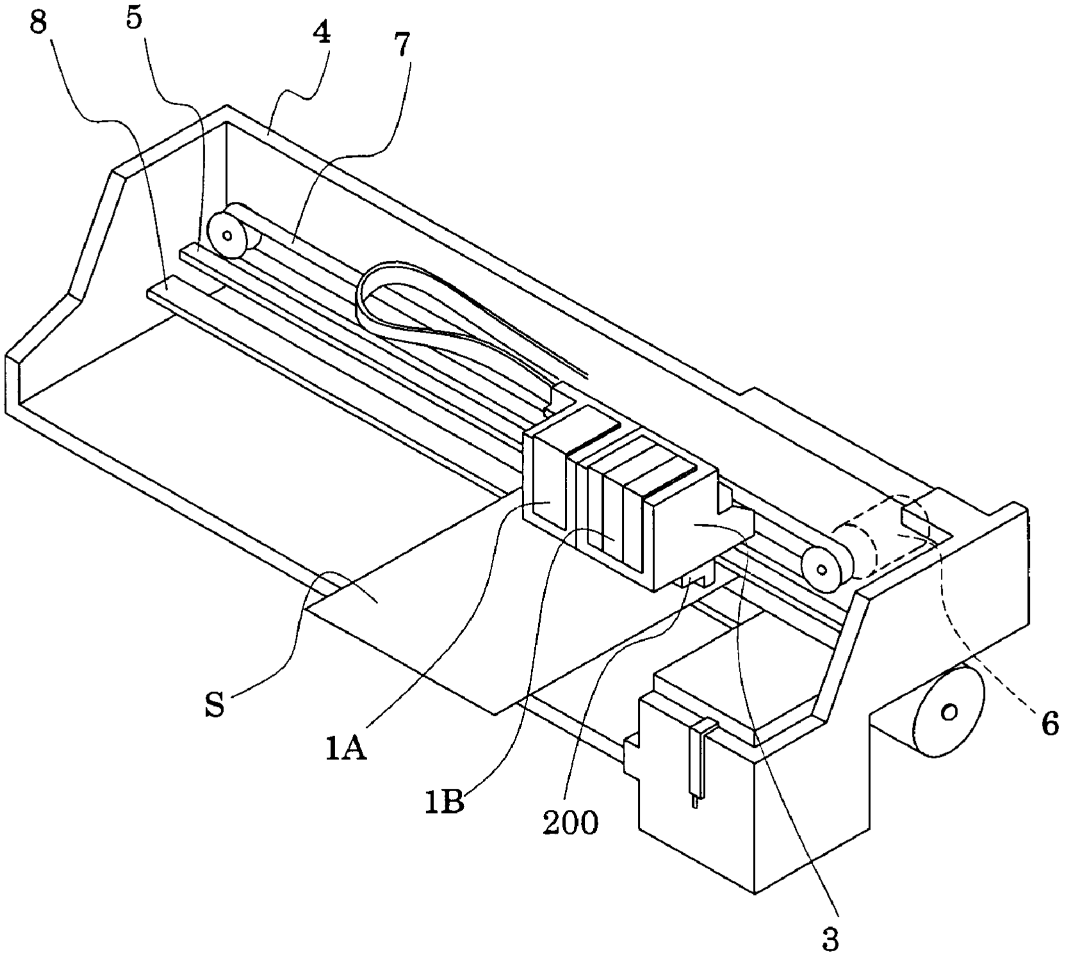
FIG. 9 is a schematic diagram showing an example of an ink-jet recording apparatus according to the first embodiment.

The head unit 200 of this kind is mounted on an ink-jet recording apparatus. FIG. 9 is a schematic diagram showing an example of the ink-jet recording apparatus. As shown in FIG. 9, the head unit 200 having the ink-jet recording head is provided in a manner such that cartridges 1A and 1B comprising an ink supply unit can be freely attached and detached. A carriage 3 where the head unit 200 is mounted is provided for a carriage shaft 5 attached to a device main body 4, in a manner that the carriage 3 is freely movable in an axis direction. Each ink-jet recording head of this head unit 200 is to eject, for example, black ink compositions and color ink compositions.

Furthermore, the carriage 3 mounting the head unit 200 moves along the carriage shaft 5, by conveying a driving force of a drive motor 6 via a plurality of unillustrated gears and a timing belt 7 to the carriage 3. On the other hand, the device main body 4 is provided with a platen 8 along the carriage shaft 5. A recording sheet S, which is a recording medium such as a paper fed by an unillustrated feed roller, is transferred along on the platen 8.

Other Embodiments

As described above, the descriptions were given of the embodiment of the invention. However, the invention is not limited to the above. For example, a water-repellent film for improving water repellency is actually formed on the ink droplet ejecting surface of the nozzle plate 20 of the above-mentioned first embodiment. The water-repellent film is not particularly limited, but a metal film, for example, can be cited. The metal film of this kind decreases an adhesion of an adhesive agent, when bonding the fixing plate 250 to the ink droplet ejecting surface. Therefore, it is preferable to provide the metal film only for a region exposed by the exposed opening portion 251 of the fixing plate 250. Moreover, it is possible to highly precisely form the metal film of this kind with a predetermined thickness by, for example, eutectoid plating.

Furthermore, although the alignment jig 400 is provided with the pressing unit 450 in the above-described first embodiment, it is not particularly limited to this. For example, when using the ultraviolet curing adhesive as the adhesive agent for bonding the fixing plate 250 and the ink-jet recording head 220, it is possible to bond the fixing plate 250 and the ink-jet recording head 220 by irradiating ultraviolet rays in a state where the fixing plate 250 is made to come into contact with the ink-jet recording head 220 and by curing the adhesive agent, after applying the adhesive agent to a bonding surface of the fixing plate 250. Hence, the pressing unit 450 may not be provided. Note that, unlike a thermosetting adhesive, the ultraviolet curing adhesive is not required to be cured while pressurizing the fixing plate 250 and the ink-jet recording head 220 at a predetermined pressure. It is possible to avoid a departure of the positions between the ink-jet recording head 220 and the fixing plate 250 and to bond the ink-jet recording head 220 and the fixing plate 250 with high precision, due to pressurization. Additionally, in the bonding by use of the ultraviolet curing adhesive, the bonding strength is relatively weak. In this case, it is sufficient if surroundings such as a corner, which is formed by the ink-jet recording head 220 and the fixing plate 250, is fixed with a thermosetting adhesive, after bonding the fixing plate 250 to the ink-jet recording head 220 with the ultraviolet curing adhesive. For this reason, it is possible to improve reliability by highly precisely and firmly bonding the fixing plate 250 to the ink-jet recording head 220.

Furthermore, in the above-mentioned first embodiment, the fixing plate 250 formed of a flat plate is exemplified as a fixing member for bonding the plurality of the ink-jet recording heads 220. However, the fixing member is not limited to the fixing plate 250. For example, the plurality of the ink-jet recording heads 220 may be aligned with and bonded directly to the cover head 240. Even in this case, it is possible to perform alignment with high precision by use of the above-mentioned alignment jig 400, thus performing the bonding.

Moreover, in the above-mentioned first embodiment, the ink-jet recording head 220 of a flexible vibration type is exemplified. However, the ink-jet recording head 220 is not limited to this. It is natural that the ink-jet recording head 220 may be applied to head units having ink-jet recording heads with various structures such as an ink-jet recording head of a vertical vibration type where a piezoelectric material and an electrode forming material are sequentially laminated and are expanded in an axis direction, and an ink-jet recording head which ejects ink droplets by use of bubbles caused by heat generated due to an exothermic element and the like.

Note that the head unit and the ink-jet recording apparatus, which have the ink-jet recording head as a liquid-jet head to eject ink, are exemplified. However, the invention widely targets all methods of manufacturing liquid-jet head units which have the liquid-jet head. For example, a recording head used for an image recording device such as a printer, a color material jet head used for manufacturing a color filter such as a liquid crystal display, an electrode material jet head used for forming an electrode such as an organic EL display and a field emission display (FED), and a bioorganic jet head used for manufacturing a bio chip can be cited as the liquid-jet heads.

What is claimed is:

1. An alignment jig comprising:

a base jig, a mask being directly bonded on the base jig, a spacer jig being directly bonded on the mask, wherein an optical system is provided at an opposite side of the mask with respect to the base jig, wherein the mask is made of glass, and a plane of a spacer jig side of the mask being provided with a reference mark for being aligned with an alignment mark to overlap the alignment mark, the alignment mark being provided on a nozzle plate which is provided with nozzle orifices for ejecting liquid of a liquid-jet head, wherein the spacer jig is configured to hold a fixing member that abuts and holds a portion of a surface of the nozzle plate where the ejected liquid is output through the nozzle orifices, and wherein the alignment jig is used for aligning the nozzle plate of the liquid-jet head with the fixing member.

2. The alignment jig according to claim 1, wherein the base jig is bonded to the mask with a wax interposed therebetween, as well as the mask is bonded to the spacer jig with a wax interposed therebetween.

3. The alignment jig according to claim 2, wherein the wax is photo-setting and thermosoftening.

4. The alignment jig according to claim 1, wherein a bonding region of the mask and the base jig is a peripheral portion along a periphery of the mask.

5. The alignment jig according to claim 4, wherein a groove portion is provided in the bonding region of the base jig.

6. The alignment jig according to claim 1, wherein a suction unit which suctions the fixing member is connected to the spacer jig.

7. The alignment jig according to claim 1, wherein the spacer jig has an area smaller than that of the mask.

8. The alignment jig according to claim 1, wherein a pressing unit for pressing the liquid-jet head against the fixing member side is provided.

9. The alignment jig according to claim 8, wherein the pressing unit includes:

a pressing pin;

an energizing unit which energizes the pressing pin toward the liquid-jet head side; and a pressing top which presses the liquid-jet head while uniformly propagating a pressing force of the pressing pin over the liquid-jet head.

10. The alignment jig according to claim 1, wherein the optical system, which checks relative positions of the reference mark and the alignment mark, is provided on a side of the base jig opposite to the mask.

11. The alignment jig according to claim 1, wherein the base jig is disposed under the mask over which the space jig is disposed, the base jig comprising a plurality of holes penetrating a thickness direction of the base jig, the holes being configured to allow to check alignment of the reference mark and the alignment mark through the mask.

* * * * *